(12) United States Patent
Vezina (10) Patent No.: US 6,971,802 B2
(45) Date of Patent: Dec. 6, 2005

(54) BEARING PRELOAD CAGE ASSEMBLY (76) Inventor: Martin J. Vezina, 19 Whitney La., East Lyme, CT (US) 06333

( * ) Notice: Subject to any disclaimer, the term of this patent is extended or adjusted under 35 U.S.C. 154(b) by 51 days.

(21) Appl. No.: 10/746,322

(22) Filed: Dec. 23, 2003

(65) Prior Publication Data
US 2005/0135718 A1 Jun. 23, 2005

(51) Int. Cl.$^7$ .............................................. F16C 19/08
(52) U.S. Cl. ...................................................... 384/517
(58) Field of Search ............................. 384/517, 563, 384/518, 537, 540

(56) References Cited

U.S. PATENT DOCUMENTS

| | | |
|---|---|---|
| 1,399,959 A | 12/1921 | Hanson |
| 3,900,232 A | 8/1975 | Rode |
| 4,085,984 A | 4/1978 | Cameron |
| 4,172,621 A | 10/1979 | Yoshida |
| 4,541,742 A | 9/1985 | Lederman ................... 384/518 |
| 4,850,719 A | 7/1989 | Moseley et al. ............... 384/1 |
| 5,030,016 A | 7/1991 | Schoeffter ................... 384/448 |
| 5,564,840 A | 10/1996 | Jurras, III et al. .......... 384/517 |
| 6,032,336 A | 3/2000 | Fujiwara ....................... 19/258 |
| 6,409,390 B1 | 6/2002 | Bouzakis et al. ........... 384/517 |

Primary Examiner—Lenard A. Footland
(74) Attorney, Agent, or Firm—Albert W. Hilburger (57) ABSTRACT

A bearing preload cage assembly for rotatably supporting an axially loaded shaft includes a bearing housing including stationary axially opposed supporting members, first and second axially spaced bearings, each including inner and outer races and rolling elements, first and second cylindrical cage segments coaxial with the shaft, each including a sleeve and circumferentially spaced axially protruding castellations, the outer races engageably received on an internal surface of their associated sleeve, the castellations of each cage segment proximate to and engageable with the outer race of the adjacent bearing, the supporting members proximate to and engageable with an adjacent cage segment, a resilient member biasing at least one of the outer races into full engagement with its rolling elements and, in turn, its rolling elements into full engagement with their inner race whereby the rolling elements of both bearings are maintained in full engagement with their inner and outer races continuously during shaft rotation.

31 Claims, 7 Drawing Sheets

BEARING PRELOAD CAGE ASSEMBLY

BACKGROUND OF THE INVENTION

1. Field of the Invention

The present invention relates generally to paired configurations of rolling element bearings particularly for those bearings operating at medium to high speeds and subjected to variable loading.

2. Description of the Prior Art

Paired bearings are well known in the art and may be generally described as two duplex bearing assemblies, each having concentric annular inner and outer races which rotate relative to each other, and an annular arrangement of load-supporting rotating elements, such as balls or rollers, located between the races. Angular contact bearings are configured with a radially offset shoulder on at least one of the races. This offset increases the bearings ability to support axial loads in one direction. Applications requiring support for moderate thrust loads in both directions will often incorporate a paired configuration of angular contact rolling element bearings. These bearings, when orientated opposite each other, will each support a thrust load in its respective direction. In general however, these individual bearings cannot tolerate a thrust load that is opposite its design load direction. Paired bearing configurations generally employ a combination of angular contact bearings. The orientation of the offsets in multiple bearing configurations are generally classified as either Face-to-Face (DF), Back-to-Back (DB) or Tandem (DT).

Previous configurations of paired bearings in a Back-to-Back configuration generally employ an interference fit between the inner races and the shaft of the rotating assembly. These inner races are usually clamped tightly against a shaft shoulder by a threaded shaft nut. The outer races in this configuration usually employ a slight clearance fit within the bore of a housing.

Paired bearings in a DF configuration often employ a slight clearance fit at the shaft while clamping the outer races tightly between the bearing housing end covers. In a DT configuration, multiple bearings are orientated in the same direction to increase the axial load capability of the assembly in a single direction.

The selection of a bearing configuration, in its basic sense, is predicated on loading and operational characteristics. Evolution of equipment design standards has influenced the selection in some applications. For example, a nationally recognized standard for pump design, API 610, "Centrifugal Pumps for Petroleum, Heavy Duty Chemical, and Gas Industry Services" provides the following direction: "Ball thrust bearings shall be of the duplex, single row, 40 degree angular contact type. Unless otherwise specified, bearings shall be installed back-to-back". Sizing of the bearings is then directed to the vendor or designer to suit the application and bearing life requirements.

To operate properly, most rolling element bearings must be subjected to a certain minimum load in their design direction. This minimum load is necessary to keep the rolling elements properly seated against their respective races. Optimum design for bearings in paired configurations would result in zero clearance between the rolling elements and races under steady state operating conditions. To achieve this, designers must consider factors such as the expansion of the inner race due to its interference fit on the shaft, thermal expansion of the components and loading. Many of these factors can only be estimated or assumed. For example, radial loading in a horizontal shaft application will often be assumed to be represented by the static weight of the rotating element. In a between bearing pump application however, hydraulic centering forces will act to either increase or decrease radial load on the bearings depending on the concentricity of internal components. Factors such as this are entirely dependent upon the initial machining and subsequent maintenance operations on the components and cannot be precisely anticipated by the designer.

Tacit acknowledgement of these issues is implied in section three of API 610 where undersized roller bearings are permitted for use in vertical motors to avoid skidding in normal operation.

This invention was conceived to alleviate a specific detrimental condition that occurs as a result of these uncertainties in paired configurations of angular contact rolling element bearings.

In a paired bearing configuration, as thrust load increases, the supporting bearing will deflect slightly. This causes the clearance within the opposite bearing to increase. As this clearance increases, the balls or rollers in the bearing will lose contact with the races. In ball bearing applications operating at higher speeds, the gyratory tendency of the balls will resist the curvature of the bearing races. Under these high speed, lightly loaded conditions, the balls in the unloaded bearing will begin to skid in the races. This skidding can rupture the lubricant film and result in damaging wear to the bearing.

In tapered roller bearing applications, where the orientation of the rolling elements is maintained by the internal bearing cage, excess clearance can result in accelerated wear or fatigue failure of the cage.

Internal clearances can be controlled to a degree by preloading of the bearing pair. Preloading in the conventional sense, is achieved by machining the edges of the bearing races so that the rolling elements will be pinched or loaded when the races are clamped together. Because of the precise tolerances involved in paired bearing mounting however, the optimum preload is difficult to achieve. Machine tolerance of the shaft, housing, and bearings themselves will affect preload. In addition, thermal expansion of the shaft and bearing components during operation will affect preload as well as centrifugal loads in extremely high speed applications. Because of these uncertainties, the primary risk associated with this method of preloading is the possibility that the resulting bearing load will be greater than desired and result in accelerated wear or catastrophic failure of the assembly.

A relatively common method of controlling bearing internal clearance utilizes elastic elements such as spring washers or coil springs to maintain load on the bearings. Paired bearings in a face to face orientation can be configured to utilize springs between the bearing outer races and housing end covers. Because of the load path through the rolling elements in a face to face configuration however, this orientation is generally less stable than a back to back configuration and is unsuitable for many applications. In a back to back arrangement, the load paths diverge away from the vertical center of the bearing pair, thus creating a wide triangular shaped load base with respect to the shaft centerline. The converging load paths of the face to face arrangement create a much narrower load base that is less capable of supporting the radial moments generated by shaft unbalance or misalignment. By virtue of the inherent loading through paired bearings in a conventional back to back configuration, the use of elastic elements between the outer bearing races would defeat the supporting characteristics of the bearing pair. This would allow catastrophic movement of the unloaded bearing against its design load direction.

Bearing preload cages having the construction of this invention facilitate the use of elastic elements in a paired, back to back bearing configuration. This enables designers to specify an exact axial preload on the bearings that is not subject to changes caused by thermal expansion, machine tolerances, or wear. Precise application and control of preload allows the use of rolling element bearings in high speed applications that would presently be accommodated by other bearing types.

One attempt to correct the noted problems is presented in U.S. Pat. No. 6,409,390 to Bouzakis et al. In this instance, a paired bearing mount constructed such that the inner and outer races are engaged with each other along the axis. A bearing retainer is engaged with the outer race of one of the paired bearings, movement of the paired bearings in one direction along the axis being limited by the bearing retainer. A mechanism is provided to assure a substantially constant load on the paired bearing assembly under varying amounts of displacement of the bearings in directions along the axis.

While the Bouzakis et al. bearing mount provides an effective means of limiting bearing assembly end play, the elastic elements will have virtually no effect on rolling element loading when mounted in a back-to-back configuration. Those skilled in the art will recognize that rolling element loading is largely dependent upon the spacing between the opposed first and second bearing races. This mount relies on match-machining and spacers between the inner and outer races that are subject to the same thermal and loading variations as other prior art.

Interestingly, the Bouzakis et al. patent describes several previous inventions for bearing mounts having incorporated the use of elastic elements to control bearing preload. Many of these designs have merit and have been generally successful in their intended applications, yet would not satisfy the problem addressed by the present invention.

In one instance, for example, the bearings are orientated back-to-back with the outer bearing races supported axially by a fixed immovable sleeve positioned between them. Shaft end play is set by an adjusting nut in this configuration. In this arrangement, application would be limited to those configurations that will permit the assembly sequence necessary to install a fixed sleeve in the bearing housing between the two bearings with their required interference fits.

In another instance, an outboard bearing is supported by a fixed sleeve and supports loads in the inboard direction to the limits of the bearing capacity. The inboard bearing, however, is supported ultimately by springs and, in this configuration, excessive loading in the outboard direction will collapse the springs and allow the shaft to move axially toward the outboard bearing. This will separate the races of the outboard bearing and result in a catastrophic bearing failure.

In still another instance, the bearings are configured in a face to face arrangement and, in this configuration, the load paths through the bearings converge to close proximity at the center of the shaft. This will result in an arrangement that will not support radial forces with respect to the longitudinal axis of the shaft. In addition, this arrangement requires a clearance fit between the inner race of the inboard bearing and the shaft. In this configuration, excessive loading in the inboard direction will allow the shaft to slide axially through the inner race of the inboard bearing and collapse the springs, separating the races of the outboard bearing and resulting in catastrophic bearing failure.

In yet another instance, there is a configuration of three opposing bearings. Because there are no springs between an end cover and it's adjacent bearing, excess axial loading in the direction away from the end cover will collapse springs between the bearings and allow the races of the adjacent bearing to separate, causing catastrophic failure.

Another significant prior art example of an attempt to preload bearings to counteract the detrimental conditions for which the present invention serves as a solution is presented in U.S. Pat. No. 4,085,984 to Cameron which discloses a double row bearing having sets of inner and outer races with rolling elements arranged in two rows between those races. One set of races is fixed in position with respect to each other, while the other set is movable in the axial direction. A spacer exists between the axially movable races, and that spacer contains springs which urge the races apart and impose a slight preload on either row of rollers when the row is not taking a thrust load.

Again, however, while the Cameron construction provided a significant improvement to the state of the art at the time it was conceived, problems remain. Specifically, application of this configuration is also limited to those arrangements that will permit the assembly sequence necessary to install the fixed sleeve in the bearing housing between the two bearings with their required interference fits. In addition to the apparent difficulty with the assembly of such an arrangement, this configuration has no provision for adjustment of the bearing assembly end play beyond the machining of the spacer.

A number of other disclosures, typical of the prior art in the field of paired rolling element bearings, but none addressing the problem presented by the instant disclosure in the manner of the present disclosure, are U.S. patents as follows:

U.S. Pat. No. 6,032,336 to Fujiwara
U.S. Pat. No. 5,564,840 to Jurras, III et al.
U.S. Pat. No. 5,030,016 to Schoeffter
U.S. Pat. No. 4,850,719 to Moseley eat al.
U.S. Pat. No. 4,541,742 to Lederman
U.S. Pat. No. 4,172,621 to Yoshida
U.S. Pat. No. 3,900,232 to Rode, and
U.S. Pat. No. 1,399,959 to Hanson.

It was with knowledge of the foregoing disclosures representative of the state of the art that the present invention was conceived and has now been reduced to practice.

SUMMARY OF THE INVENTION

The present invention relates to a bearing preload cage assembly for rotatably supporting an axially loaded shaft. The assembly includes a bearing housing including stationary axially opposed supporting members, first and second axially spaced bearings, each with inner and outer races and associated rolling elements. First and second cylindrical cage segments are coaxial with the shaft, each including a sleeve and circumferentially spaced axially protruding castellations, the castellations of the first cage segment interdigitating with the castellations of the second cage segment, each castellation of the first cage segment being engageable with adjacent castellations of the second cage segment. The outer races are engageably received on an internal surface of their associated sleeve, the castellations of one cage segment being proximate to and engageable with the outer race of the adjacent bearing. The supporting members are proximate to and engageable with an adjacent cage segment and a resilient member biases at least one of the outer races into full engagement with its rolling elements and, in turn, its rolling elements into full engagement with their inner race. With this construction, the rolling elements of both bearings are maintained in full engagement with their inner and outer races continuously during shaft rotation.

The unique advantage of the preload cage concept is that it allows the bearings to be mounted in a back to back configuration that will not allow damaging movements of the unloaded bearing when shaft axial loads exceed spring force. Preload cages allow the precise application of a specific minimum load to the bearings while permitting each bearing to support axial shaft loads to it's rated capacity. Bearing loads imposed by the elastic elements in this configuration are counteracted by shaft axial loads. Because of this, these spring loads are not additive to the shaft loads and they do not de-rate the overall load capacity of the bearings. In addition, these cages allow relatively simple assembly and can be configured with provision to facilitate adjustment of bearing assembly end play through shimming of one of the bearing housing end covers.

Accordingly, a primary feature of the present invention is the provision of a compact paired bearing mount, particularly for those bearings which must operate at medium to high speeds under changing load conditions.

An additional primary feature of the present invention is the provision of a bearing preload cage assembly for rotatably supporting a shaft subject to axial loading such that, at all times during rotation of the shaft, the rolling elements of the bearings are maintained in full engagement with their associated inner race and outer race.

Another feature of the present invention is the provision of a bearing preload cage assembly for rotatably supporting an axially loaded shaft which includes a bearing housing including stationary axially opposed supporting members, first and second axially spaced bearings, each including inner and outer races and rolling elements, first and second cylindrical cage segments coaxial with the shaft, each including a sleeve and circumferentially spaced axially protruding castellations, the outer races engageably received on an internal surface of their associated sleeve, the castellations of one cage segment proximate to and engageable with the outer race of the adjacent bearing, the supporting members proximate to and engageable with an adjacent cage segment, a resilient member biasing at least one of the outer races into full engagement with its rolling elements and, in turn, its rolling elements into full engagement with their inner race whereby the rolling elements are maintained in full engagement with their inner and outer races continuously during shaft rotation.

A further feature of the invention is the provision of such a bearing preload cage assembly for which the castellations of the first cage segment interdigitate with the castellations of the second cage segment, each castellation of the first cage segment being engageable with adjacent castellations of the second cage segment.

Still another feature of the invention is the provision of such a bearing preload cage assembly according to which the resilient member biases the first cage segment into engagement with the second outer race and biases the second cage segment into engagement with the first outer race.

Yet another feature of the invention is the provision of such a bearing preload cage assembly according to which the resilient member is intermediate and engaged with the first and second cage segments.

Still a further feature of the invention is the provision of such a bearing preload cage assembly according to which the resilient member is intermediate and engaged with the first and second outer races.

Yet a further feature of the invention is the provision of such a bearing preload cage assembly according to which the resilient member directly biases the second cage segment into engagement with the first outer race and indirectly biases the second outer race into engagement with the first cage segment.

Still another feature of the invention is the provision of such a bearing preload cage assembly according to which the first cage segment has an annular mounting flange fixed to the inboard bearing end cover for preventing rotation of the first and second cage segments relative to the bearing housing.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate several of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
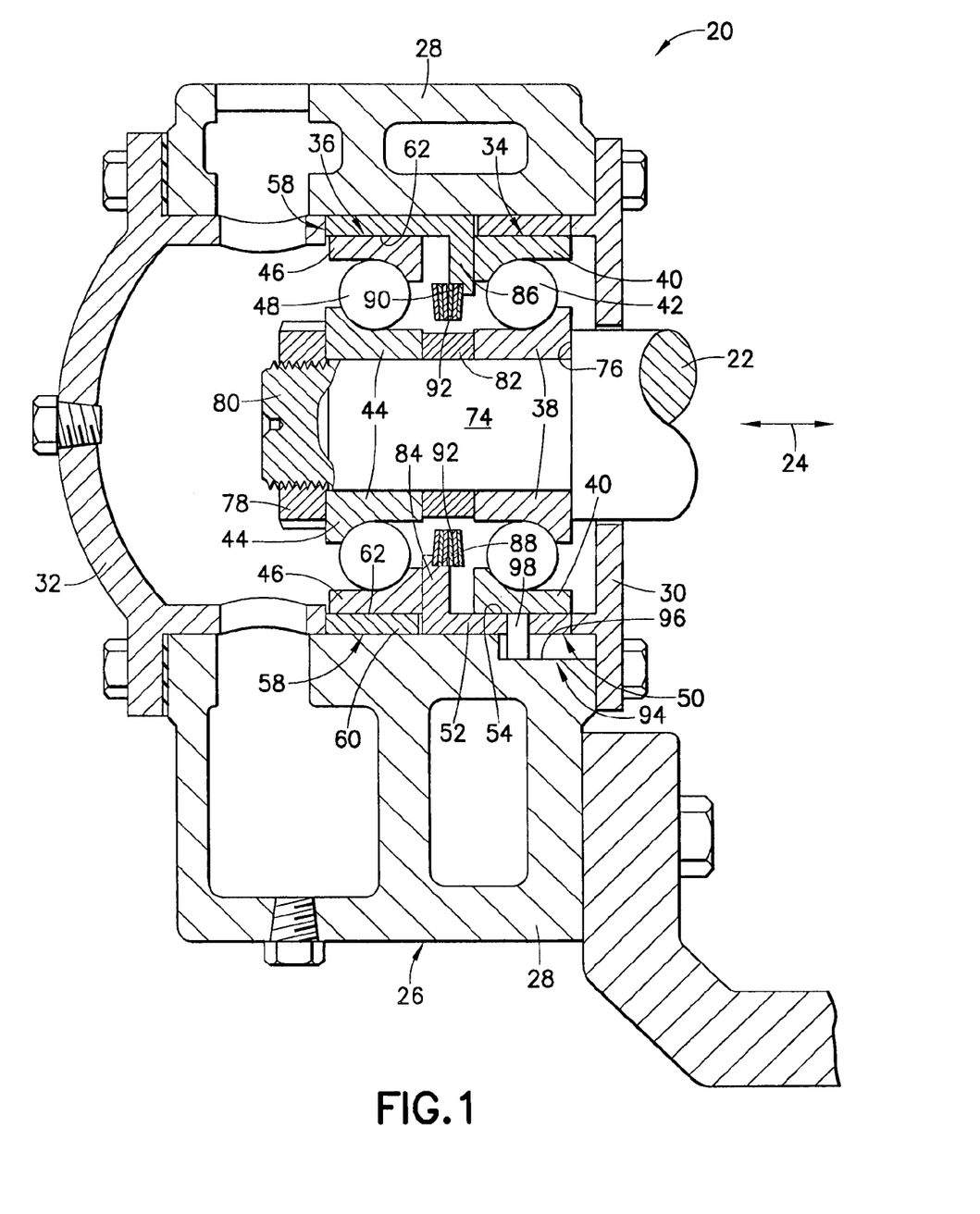
FIG. 1 is a cross section view of a basic preload cage assembly embodying the present invention.

Turn now to the drawings and, initially, to FIG. 1 in which is shown, diagrammatically, an elevation cross section view of a bearing preload cage assembly 20, incorporating features of the present invention, for rotatably supporting one end of a shaft 22 subject to axial loading as depicted by a double-headed arrow 24. Although the present invention will be described with reference to the embodiments shown in the drawings, it should be understood that the present invention can be embodied in many alternate forms or embodiments. In addition, any suitable size, shape or type of elements or materials consistent with the invention could be used.

The bearing preload cage assembly 20 includes a bearing housing 26 including a main housing member 28, a first supporting member 30 which is, in actuality, an inboard bearing end cover fixed to the main housing member, and a second supporting member 32 which is, in actuality, an outboard bearing end cover fixed to the main housing member. The cage assembly 20 further includes first and second axially spaced bearings 34, 36, respectively, for supporting the shaft 22 on the bearing housing 26. The first bearing 34 includes a first inner race 38 fixed on the shaft 22, a first outer race 40 with a radially offset shoulder, and a first plurality of rolling elements 42 engageably interposed between the first inner race and the first outer race. The rolling elements 42 may be balls, rollers, needles, or any other suitable form of rolling component. In a similar fashion, the second bearing 36 includes a second inner race 44 fixed on the shaft 22, a second outer race 46 also with a radially offset shoulder, and a second plurality of rolling elements 48, similar in all respects to the rolling elements 42 engageably interposed between the second inner race and the second outer race. The radially offset shoulders of outer races 40 and 46, when presented towards each other, provide a back-to-back configuration as described below with respect to FIG. 3.

Figure 2:
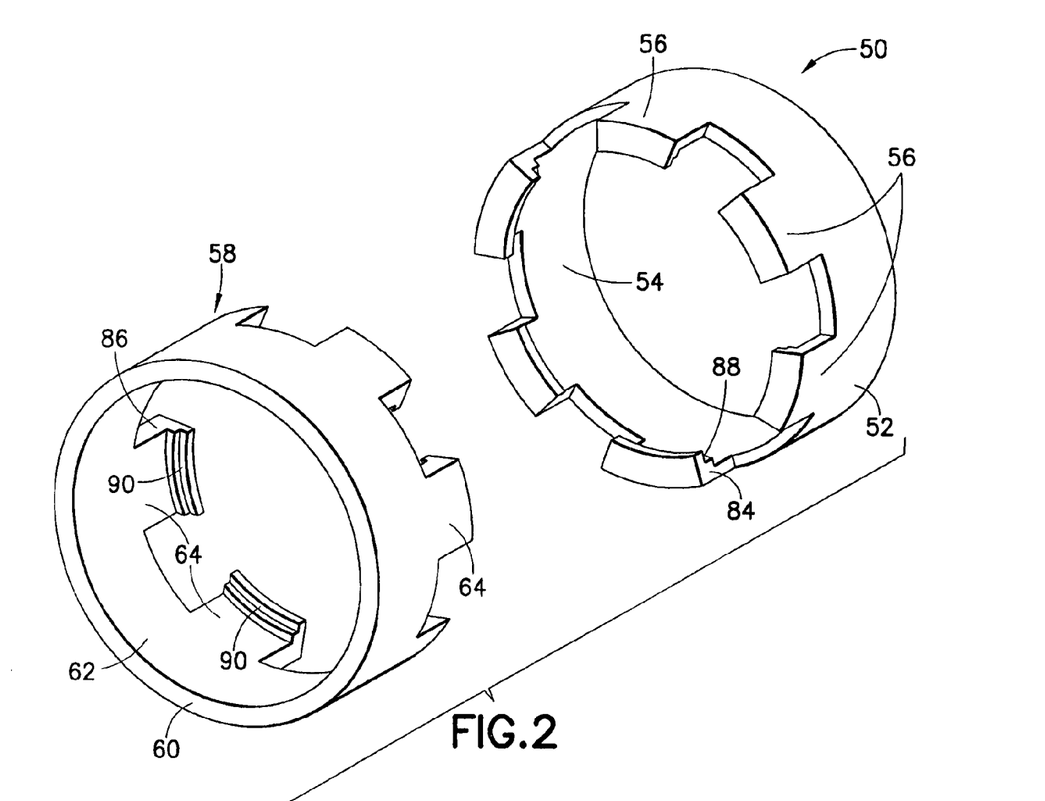
FIG. 2 is a perspective view of a pair of interactive components, specifically, of cage segments, illustrated in FIG. 1.

Viewing now FIG. 2 together with FIG. 1, a first cylindrical cage segment 50 which is coaxial with the shaft 22 is seen to include a first sleeve 52 having an internal surface 54 and a plurality of circumferentially spaced castellations 56 axially protruding from the first sleeve. In a similar fashion, a second cylindrical cage segment 58, also coaxial with the shaft 22, includes a second sleeve 60 having an internal surface 62 and a plurality of circumferentially spaced castellations 64 axially protruding from the second sleeve. The castellations 56 of the first cage segment 50 interdigitate with the castellations 64 of the second cage segment 58, each castellation 56 being engageable with its adjacent castellations 64.

Turning back to FIG. 1, the first outer race 40 is engageably received on the internal surface 54 of the first sleeve 52 and the second outer race 46 is engageably received on the internal surface 62 of the second sleeve 60. The castellations 56 of the first cage segment 50 are positioned proximate to and are engageable with the outer race 46 of the second bearing 36 and the castellations 64 of the second cage segment 58 are positioned proximate to and are engageable with the outer race 40 of the first bearing 34. The inboard bearing end cover 30 is proximate to and engageable with the first cage segment 50 for preventing its axial movement in an inboard direction and the outboard bearing end cover 32 is proximate to and engageable with the second cage segment 58 for preventing its axial movement in an outboard direction. It is noteworthy that in order for the invention to operate satisfactorily, there must be some amount of clearance, though minimal, between and among the supporting members or end covers 30, 32 and the cage segments 50, 58 in the axial direction. A typical range of clearances, though not limiting of the invention, might be about 0.005 to 0.010 inches with the further understanding that operating conditions would have a substantial bearing on such a determination.

Figure 3:
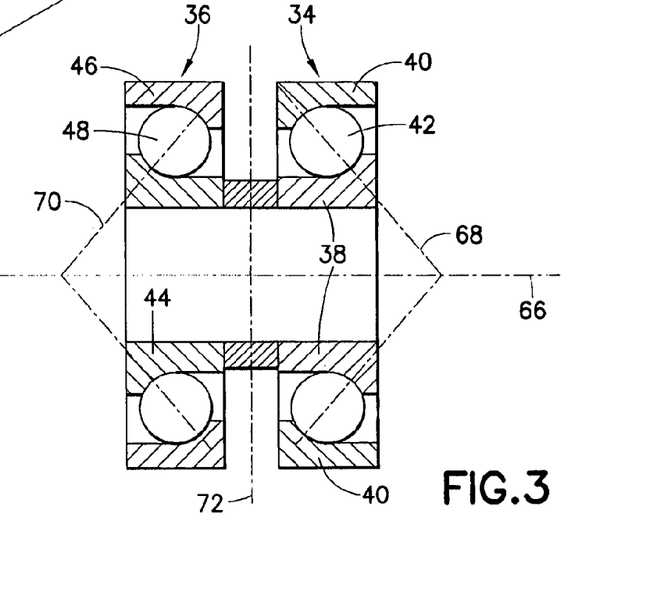
FIG. 3 is a diagrammatic cross section view of paired bearings illustrated in FIG. 1.

With continued reference to FIG. 1 and with the further aid of FIG. 3, the first and second bearings 34, 36 are seen to be positioned in a back-to-back arrangement. In FIG. 3, the longitudinal axis of the shaft 22 is indicated by reference numeral 66 and lines 68, 70 represent the load paths through the angular contact surfaces of the respective races and rolling elements of the bearings 34, 36, respectively. In a back to back arrangement, as illustrated, the load paths diverge away from a vertical center 72 of the bearing pair, thus creating a wide triangular shaped load base with respect to the shaft centerline. This orientation takes advantage of the angular contact geometry to provide optimum capability with respect to loading and rotating element stability.

Again turning back to FIG. 1, the first and second inner races 38, 44 are fixed on a reduced intermediate end portion 74 of the shaft 22. The first inner race 38 engageably abuts an annular shoulder 76 of the shaft facing the reduced intermediate end portion 74 and a nut 78 is threadedly received on a threaded terminal end portion 80 of the shaft 22, the terminal end portion being reduced in diameter from the intermediate end portion 74. When tightened, the nut 78 is engaged with the inner race 44 of the second bearing 36 and biases the inner races of the bearings 36, 34 against the annular shoulder 76 of the shaft 22.

A ring-like spacer 82 is received on the intermediate end portion 74 between the inner races 38, 44, respectively, of the bearings 34, 36 but would not be necessary if the inner races 38, 44 were axially lengthened to fill the void occupied by the spacer.

As seen in FIGS. 1 and 2, each castellation 56 of the first cage segment 50 terminates at a radially inwardly extending first castle flange 84 and each castellation 64 of the second cage segment 58 terminates at a radially inwardly extending second castle flange 86. Further, the castle flange 84 has an annular recess 88 facing toward the castle flange 86 and the castle flange 86 has an annular recess 90 facing toward the castle flange 84. A resilient member 92 which may be in the form of a spring washer or a series of spring washers of the Belleville spring type, for example, are received in the annular recesses 88, 90 intermediate and engaged with the first and second castle flanges so as to bias the first castle flange 84 into engagement with the second outer race 46 and the second castle flange 86 into engagement with the first outer race 40.

The resilient member 92 serves to bias the second cage segment 58 into engagement with the first outer race 40, the first outer race into full engagement with the rolling elements 42 and, in turn, the rolling elements 42 into full engagement with the first inner race 38. In similar fashion, the resilient member 92 serves to bias the first cage segment 50 into engagement with the second outer race 46, the second outer race into full engagement with the rolling elements 48 and, in turn, the rolling elements 48 into full engagement with the second inner race 44. Of course, the entire system is being held axially between the end covers 30, 32. Therefore, with this construction, at all times during rotation of the shaft 22, the rolling elements 42 of the first bearing 34 are maintained in full engagement with the first inner race 38 and with the first outer race 40 and the rolling elements 48 of the second bearing 36 are maintained in full engagement with the second inner race 44 and with the second outer race 46.

An anti-rotation member 94 is provided intermediate and engaged with the bearing housing 26 and with one of the cage segments 50, 58 for preventing rotation of the cage segments relative to the bearing housing. To this end, the main housing member 28 has an axially extending slot 96 and a radially extending pin 98 is fixed on one of the cage segments, in the instance illustrated, the cage segment 50 and is slidably received with the slot for preventing rotation of the cage segment relative to the bearing housing. Because of the interdigitating relationship between the castellations 56 and 64, when the cage segment 50 is held against rotation relative to the bearing housing, the same is true for the cage segment 58.

Figure 4:
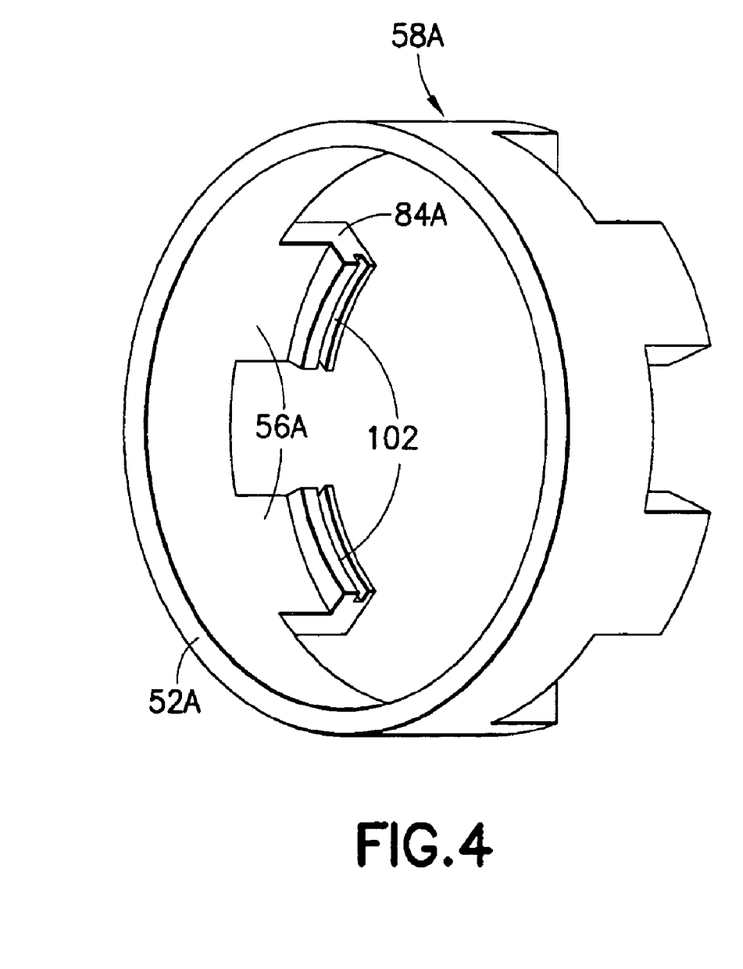
FIG. 4 is a perspective view of a modified cage segment employed with another embodiment of the invention.
Figure 5:
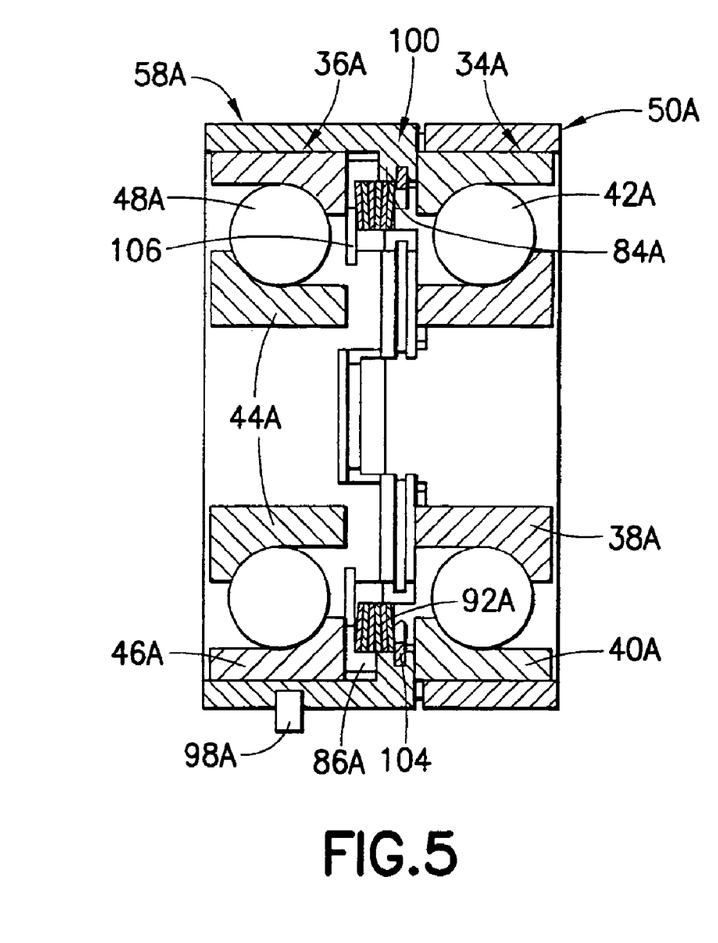
FIG. 5 is a cross section view of a portion of the preload cage assembly illustrated in FIG. 1 but depicting the embodiment of the invention which employs the modified cage segment of FIG. 4.

Turn now to FIGS. 4 and 5 for the description of another embodiment of the invention. In this instance, a retainer 100 (FIG. 5) is removably attachable to at least one castle flange 84A for positioning a resilient member 92A, possibly in the form of an annular spring washer popularly referred to as a Belleville washer or multiples of such washers, intermediate first and second castle flanges 86A, 84A, For this purpose, viewing FIG. 4, a modified cage segment 58A is seen to include a sleeve 52A having a plurality of circumferentially spaced castellations 56A axially protruding from the sleeve. Each castellation 56A terminates at the radially inwardly extending castle flange 84A which has an annular groove 102. A retainer ring 104 (FIG. 5) is inserted into the annular groove 102 and the resilient member 92A is received on the castle flange 84A bearing against the retainer ring on the cage segment 58A and engaged with a retention shoulder 106 of the adjoining cage segment 50A Alternatively, instead of the cage segment 50A having a retention shoulder 106, it may be constructed with an annular groove and retainer ring in the manner of the cage segment 58A with the resilient member 92A being held between two opposed retainer rings. In any event, as with the previous embodiment, in this instance, the resilient member 92A serves to bias the first castle flange 86A into engagement with the second outer race 46A and the second castle flange 84A into engagement with the first outer race 40A. In addition to the retainer ring concept described herein, it is conceivable that many variations of a removable retaining device would be suitable for this intended function.

Figure 6:
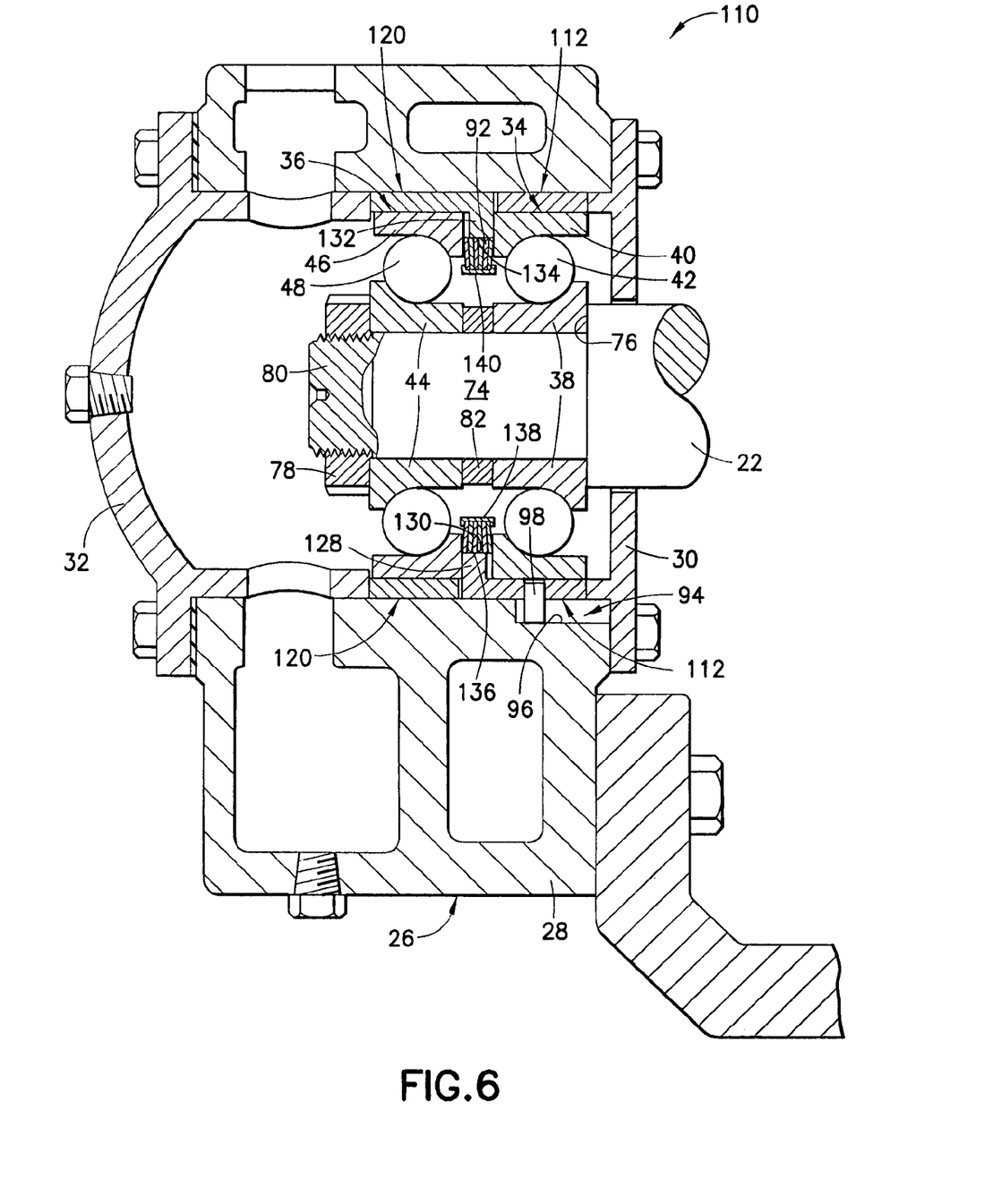
FIG. 6 is a cross section view, similar to FIG. 1, illustrating another embodiment of the present invention.
Figures 7, 8:
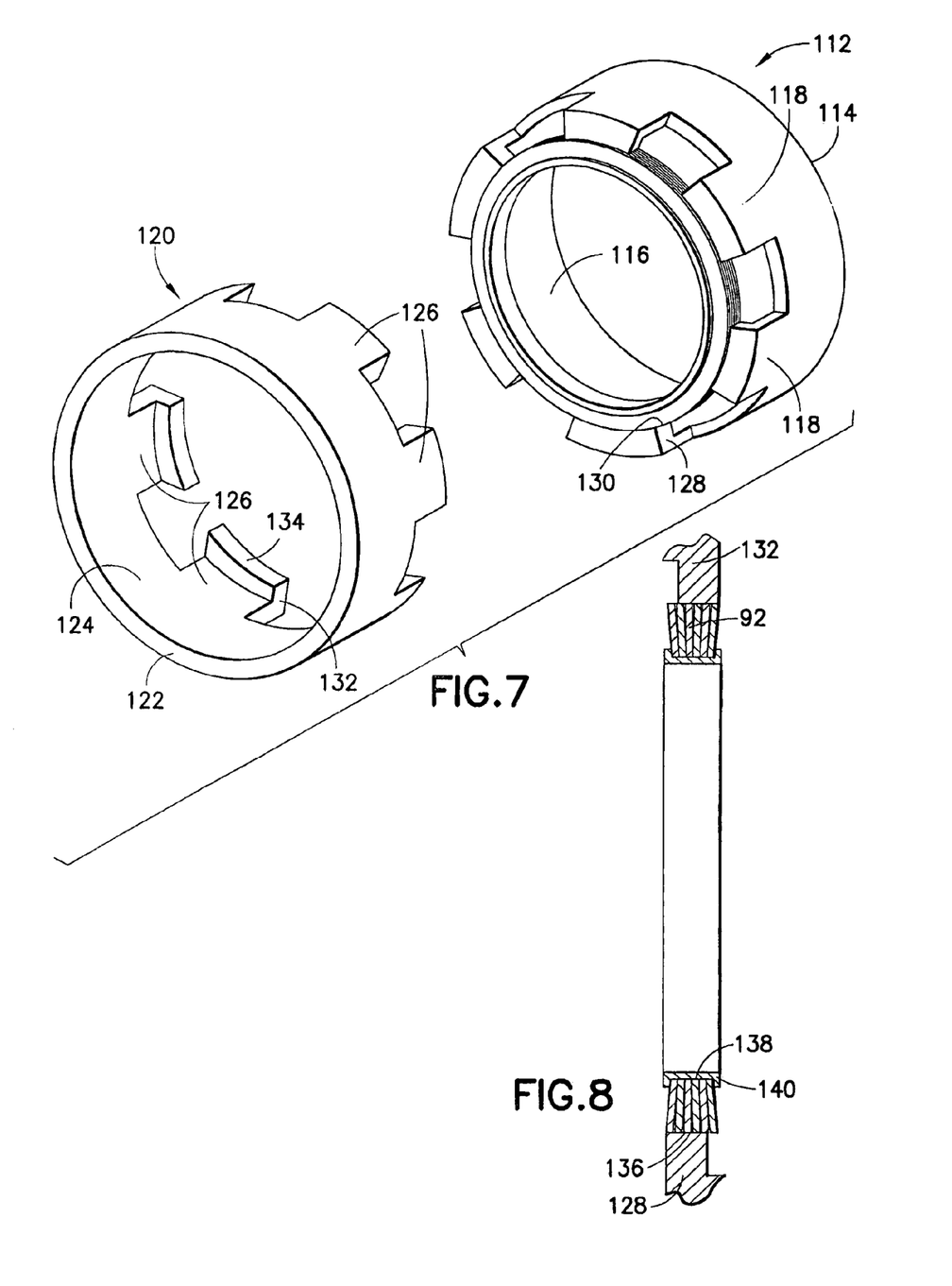
FIG. 7 is a perspective view, similar to FIG. 2, illustrating a pair of interactive components, specifically, of cage segments, used with the embodiment illustrated in FIG. 6.
FIG. 8 is an enlarged view of a part of FIG. 6 with parts removed for clarity.

Turn now to FIGS. 6–8 for the description of still another embodiment of the invention. For ease of understanding the construction of the invention, where components are physically unchanged from the bearing preload cage assembly 20, that is, the embodiment described in FIGS. 1–3, the reference numerals will remain unchanged and where components are physically changed or are newly presented, new reference numerals will be employed. In this instance, a modified bearing preload cage assembly 110 includes the bearing housing 26 including the main housing member 28, the first supporting member 30 which is, in actuality, the inboard bearing end cover fixed to the main housing member, and the second supporting member 32 which is in actuality, the outboard bearing end cover fixed to the main housing member. The cage assembly 110 further includes the first and second axially spaced bearings 34, 36 for supporting the shaft 22 on the bearing housing 26. As previously, the first bearing 34 includes the first inner race 38 fixed on the shaft 22, the first outer race 40, and the first plurality of rolling elements 42 engageably interposed between the first inner race and the first outer race. Also, as previously, the rolling elements 42 may be balls, rollers, needles, or any other suitable form of rolling component. In a similar fashion, the second bearing 36 includes the second inner race 44 fixed on the shaft 22, the second outer race 46, and the second plurality of rolling elements 48, similar in all respects to the rolling elements 42 engageably interposed between the second inner race 44 and the second outer race 46.

Also, the first and second inner races 38, 44 are fixed on the reduced intermediate end portion 74 of the shaft 22. The first inner race 38 engageably abuts the annular shoulder 76 of the shaft facing the reduced intermediate end portion 74 and a nut 78 is threadedly received on the threaded terminal end portion 80 of the shaft 22, the terminal end portion being reduced in diameter from the intermediate end portion. When tightened, the nut 78 is engaged with the inner race 44 of the second bearing 36 and biases the inner races of the bearings 36, 34 against the annular shoulder 76 of the shaft 22. In actual practice, a lock washer may be employed but is not here illustrated. Again, as in the earlier construction, the ring-like spacer 82 is received on the intermediate end portion 74 between the inner races 38, 44, respectively, of the bearings 34, 36 but, again, would not be necessary if the inner races 38, 44 were axially lengthened to fill the void occupied by the spacer.

Further, in this instance, a first cylindrical cage segment 112, generally similar to cage segment 50, is coaxial with the shaft 22 and includes a first sleeve 114 having an internal surface 116 and a plurality of circumferentially spaced castellations 118 axially protruding from the first sleeve. In similar fashion, a second cylindrical cage segment 120, generally similar to cage segment 58, is also coaxial with the shaft 22 and includes a second sleeve 122 having an internal surface 124 and a plurality of circumferentially spaced castellations 126 axially protruding from the second sleeve. The castellations 118 of the first cage segment 112 interdigitate with the castellations 126 of the second cage segment 120, each castellation 118 being engageable with its adjacent castellations 126.

As especially well seen in FIG. 7, each castellation 118 of the first cage segment 112 terminates at a radially inwardly extending first castle flange 128 having a terminal rim 130 and each castellation 126 of the second cage segment 120 terminates at a radially inwardly extending second castle flange 132 having a terminal rim 134. In this instance, the resilient member 92 is received on the terminal rims 130, 134 of the first and second castle flanges 128, 132 intermediate and engaged with the first and second outer races 40, 46 biasing the first outer race into full engagement with the rolling elements 42 and, in turn, the rolling elements 42 into full engagement with the first inner race 38, and biasing the second outer race 46 into full engagement with the rolling elements 48 and, in turn, the rolling elements 48 into full engagement with the second inner race 44. Of course, the entire system is being held axially between the end covers 30, 32. Therefore, with this construction, at all times during rotation of the shaft 22, the rolling elements 42 of the first bearing 34 are maintained in full engagement with the first inner race 38 and with the first outer race 40 and the rolling elements 48 of the second bearing 36 are maintained in full engagement with the second inner race 44 and with the second outer race 46.

The resilient member 92, as earlier described, may be in the form of a spring washer or a multiple series of spring washers of the Belleville spring type. In any event, viewing especially FIG. 8, the resilient member 92 has an outer surface 136 with an outer diameter and an inner surface 138 with an inner diameter and an annular retainer 140 engageably supports the inner surface of the spring.

Figure 9:
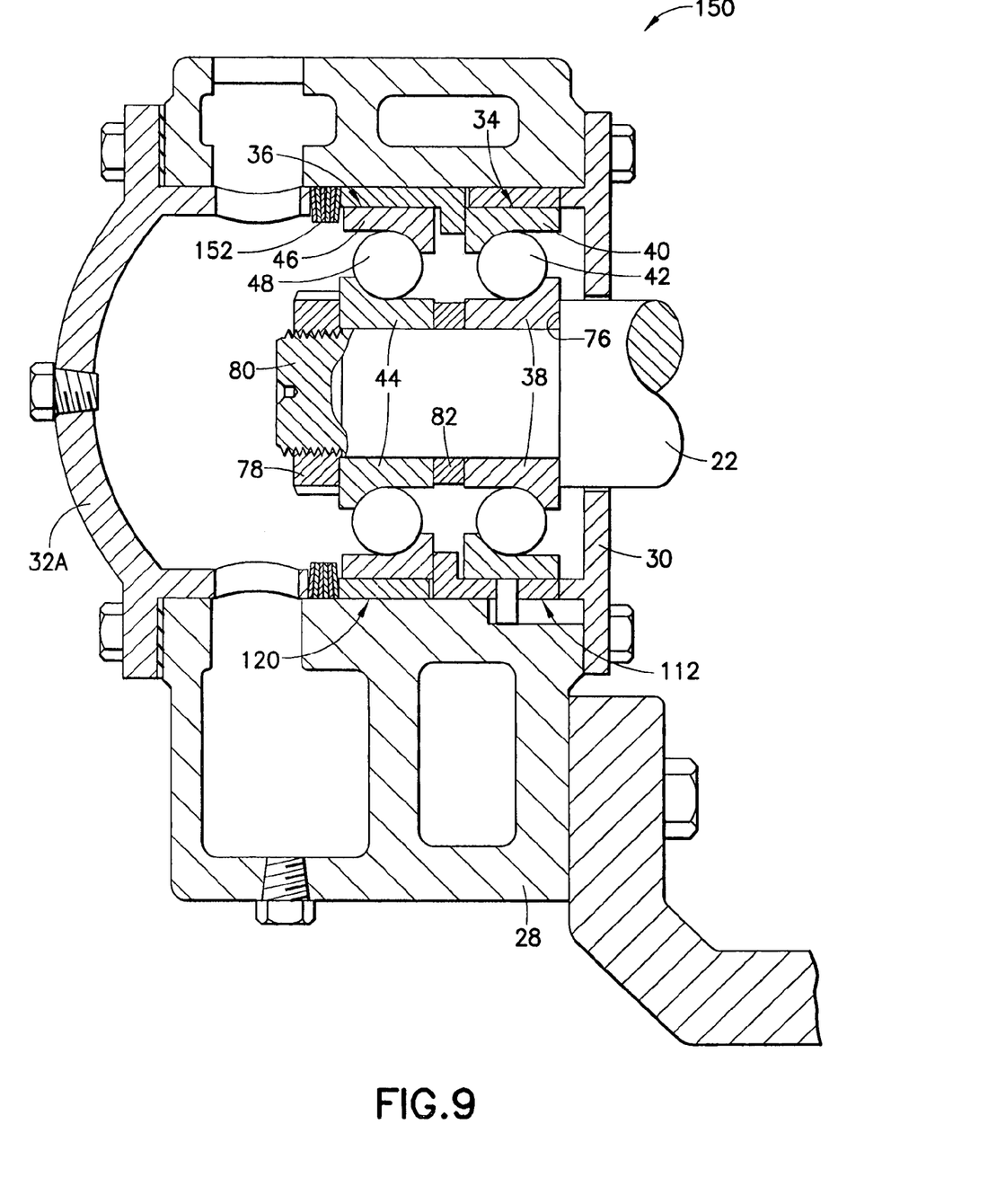
FIG. 9 is a cross section view, similar to FIGS. 1 and 6, illustrating still another embodiment of the present invention.

Turn now to FIG. 9 for another embodiment of the invention. In this instance, a modified bearing preload cage assembly 150 includes a resilient member 152 which directly biases the second cage segment 120 into engagement with the first outer race 40 and indirectly biases the second outer race 46 into engagement with the first cage segment 112.

In this instance, all components of the bearing preload cage assembly 150 are the same as the cage assembly 110 with the exception of a modified outboard bearing end cover 32A which is modified with respect to the end cover 32 of the previous embodiments to receive the resilient member 152 between it and the cage segment 120. As previously described, the resilient member 152 may be in the form of a spring washer or a series of spring washers of the Belleville spring type. In any event, viewing FIG. 9, the resilient member 152 is positioned intermediate and engaged with the second supporting member 32A and the second cage segment 120. Thus, the system is loaded by way of the resilient member 152 reacting from the bearing end cover 32A and operating against the outer race 40, rolling elements 42, inner race 38, to the shaft 22 at the annular shoulder 76, then back through spacer 82, inner race 44, rolling elements 48 to outer race 46. The result is, as with all other embodiments of this invention, that at all times during rotation of the shaft 22, the rolling elements 42 of the first bearing 34 are maintained in full engagement with the first inner race 38 and with the first outer race 40 and the rolling elements 48 of the second bearing 36 are maintained in full engagement with the second inner race 44 and with the second outer race 46.

Figure 10:
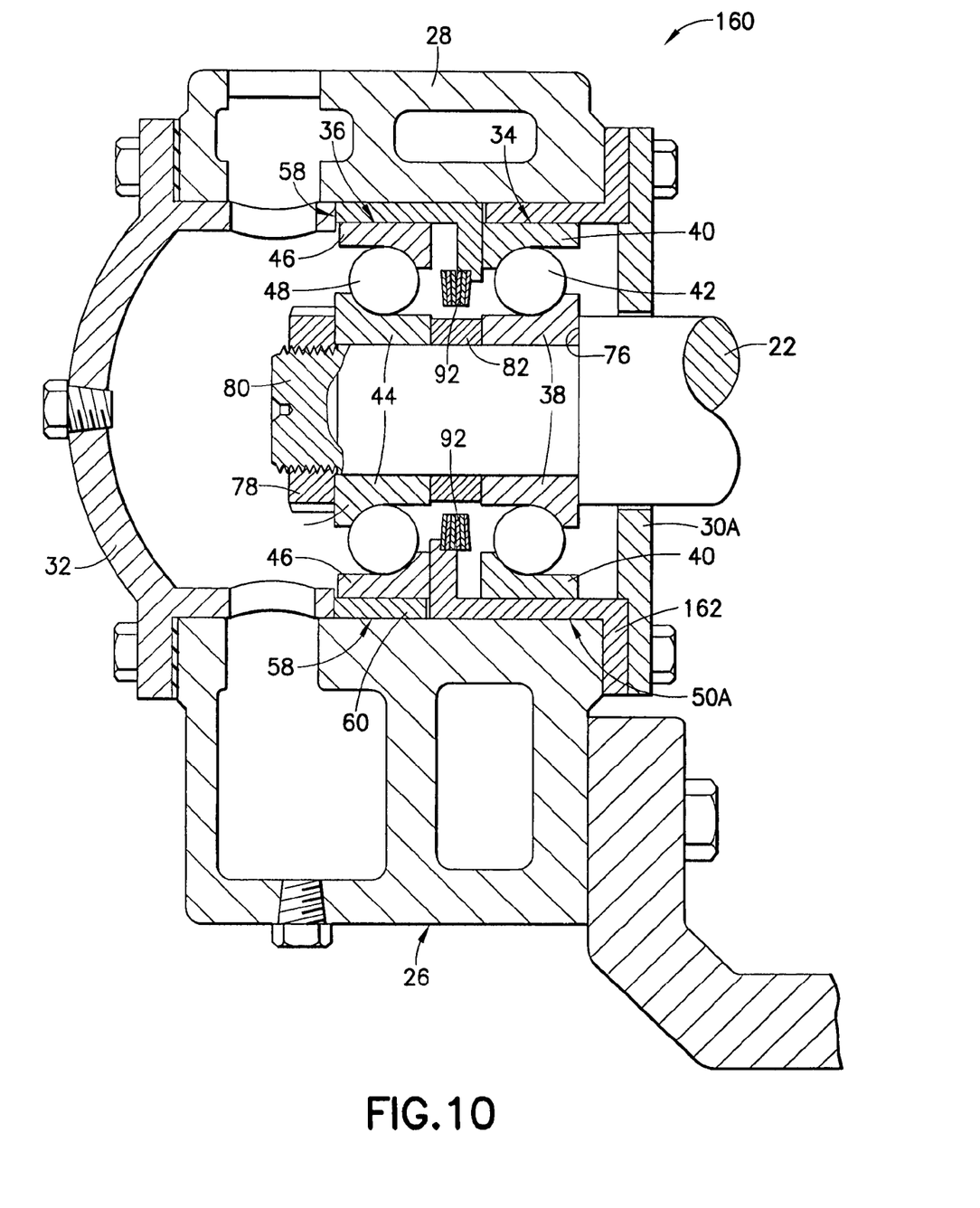
FIG. 10 is a cross section view, similar to FIGS. 1, 6, and 9, illustrating yet another embodiment of the present invention.

Turn now to FIG. 10 for yet another embodiment of the invention. In this instance, all components of a further modified bearing preload cage assembly 160 are the same as the cage assembly 20 (FIGS. 1–5) with the exception of a modified inboard bearing end cover 30A which is modified from the end cover 30 of the preceding embodiments and a cage segment 50A which is modified from the cage segment 50 of the preceding embodiments. In this regard, the first cage segment 50A has an annular mounting flange 162 clamped between the main housing member 28 and the inboard bearing end cover 30A. The annular mounting flange 162 serves to improve the radial rigidity of the design as well as preventing rotation of the first and second cage segments 50A, 58 relative to the bearing housing 26. Alternatively, a flanged cage segment may be placed between the outboard end cover 32 and the main housing member 28 while utilizing a conventional cage segment 50 and end cover 30 at the inboard end.

Again, the result is, as with all other embodiments of this invention, that at all times during rotation of the shaft 22, the rolling elements 42 of the first bearing 34 are maintained in full engagement with the first inner race 38 and with the first outer race 40 and the rolling elements 48 of the second bearing 36 are maintained in full engagement with the second inner race 44 and with the second outer race 46.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A bearing preload cage assembly for rotatably supporting a shaft subject to axial loading comprising:
   a bearing housing including first and second stationary axially opposed supporting members;
   first and second axially spaced bearings for supporting the shaft on the bearing housing, the first bearing including a first inner race fixed on the shaft, a first outer race, and a first plurality of rolling elements engageably interposed between the first inner race and the first outer race, the second bearing including a second inner race fixed on the shaft, a second outer race, and a second plurality of rolling elements engageably interposed between the second inner race and the second outer race,
   a first cylindrical cage segment coaxial with the shaft including a first sleeve having an internal surface and a plurality of circumferentially spaced castellations axially protruding from the first sleeve;
   a second cylindrical cage segment coaxial with the shaft including a second sleeve having an internal surface and a plurality of circumferentially spaced castellations axially protruding from the second sleeve;
   the first outer race engageably received on the internal surface of the first sleeve;
   the second outer race engageably received on the internal surface of the second sleeve;
   the castellations of the first cage segment proximate to and engageable with the outer race of the second bearing;
   the castellations of the second cage segment proximate to and engageable with the outer race of the first bearing;
   the first supporting member proximate to and engageable with the first cage segment;
   the second supporting member proximate to and engageable with the second cage segment;
   a resilient member biasing at least one of the first and second outer races into full engagement with its associated plurality of rolling elements and, in turn, its associated plurality of rolling elements into full engagement with their associated inner race;
   whereby, at all times during rotation of the shaft, the rolling elements of the first bearing are maintained in full engagement with the first inner race and with the first outer race; and
   whereby, at all times during rotation of the shaft, the rolling elements of the second bearing are maintained in full engagement with the second inner race and with the second outer race.

2. A bearing preload cage assembly as set forth in claim 1
   wherein the resilient member biases the first cage segment into engagement with the second outer race and biases the second cage segment into engagement with the first outer race.

3. A bearing preload cage assembly as set forth in claim 1
   wherein the resilient member is intermediate and engaged with the first and second cage segments.

4. A bearing preload cage assembly as set forth in claim 1
   wherein the castellations of the first cage segment interdigitate with the castellations of the second cage segment, each castellation of the first cage segment being engageable with adjacent castellations of the second cage segment.

5. A bearing preload cage assembly as set forth in claim 1
   wherein each castellation of the first cage segment terminates at a radially inwardly extending first castle flange;
   wherein each castellation of the second cage segment terminates at a radially inwardly extending second castle flange; and
   wherein the resilient member is intermediate and engaged with the first and second castle flanges biasing the first castle flange into engagement with the second outer race and the second castle flange into engagement with the first outer race.

6. A bearing preload cage assembly as set forth in claim 5
wherein each of the first castle flanges has a first annular recess facing the second castle flanges;
wherein each of the second castle flanges has a second annular recess facing the first castle flanges; and
wherein the resilient member is received in the first and second annular recesses for thereby biasing the first cage segment into engagement with the second outer race and the second cage segment into engagement with the first outer race.

7. A bearing preload cage assembly as set forth in claim 5
wherein the resilient member is an annular spring washer; and
including:
a retainer removably attachable to at least one of the first castle flange and the second castle flange for positioning the annular spring washer intermediate the first and second castle flange.

8. A bearing preload cage assembly as set forth in claim 1
wherein the first and second bearings are positioned in a back-to-back arrangement.

9. A bearing preload cage assembly as set forth in claim 8
wherein the first and second inner races are fixed on a reduced intermediate end portion of the shaft;
wherein the first inner race engageably abuts an annular shoulder of the shaft facing the reduced intermediate end portion; and
wherein a nut is threadedly received on a threaded terminal end portion of the shaft, the terminal end portion being reduced in diameter from the intermediate end portion, the nut when tightened being engaged with the inner race of the second bearing and biasing the inner races of the second bearing and of the first bearing against the annular shoulder of the shaft.

10. A bearing preload cage assembly as set forth in claim 9
a ring-like spacer received on the intermediate end portion between the inner races of the first and second bearings.

11. A bearing preload cage assembly as set forth in claim 1
wherein the bearing housing includes:
a main housing member;
the first supporting member being an inboard bearing end cover fixed to the main housing member and engageable with the first cage segment for preventing axial movement thereof in an inboard direction; and
the second supporting member being an outboard bearing end cover fixed to the main housing member and engageable with the second cage segment for preventing axial movement thereof in an outboard direction.

12. A bearing preload cage assembly as set forth in claim 11
wherein the main housing member has an axially extending slot; and
wherein a radially extending pin is fixed on one of the cage segments and slidably received with the axially extending slot for preventing rotation of the cage segments relative to the bearing housing.

13. A bearing preload cage assembly as set forth in claim 11
wherein the main housing member has an axially extending slot; and
wherein a radially extending pin is fixed on one of the cage segments and slidably received with the axially extending slot for preventing rotation of the cage segments relative to the bearing housing.

14. A bearing preload cage assembly as set forth in claim 1
wherein the resilient member is intermediate and engaged with the first and second outer races.

15. A bearing preload cage assembly as set forth in claim 14
wherein each castellation of the first cage segment terminates at a radially inwardly extending first castle flange having a terminal rim;
wherein each castellation of the second cage segment terminates at a radially inwardly extending second castle flange having a terminal rim; and
wherein the resilient member is received on the terminal rims of the first and second castle flanges intermediate and engaged with the first and second outer races biasing the first outer race into full engagement with the first plurality of rolling elements and, in turn, the first plurality of rolling elements into full engagement with the first inner race, and biasing the second outer race into full engagement with the second plurality of rolling elements and, in turn, the second plurality of rolling elements into full engagement with the second inner race.

16. A bearing preload cage assembly as set forth in claim 15
wherein the resilient member is an annular spring washer having an outer surface with an outer diameter and an inner surface with an inner diameter; and
including:
an annular retainer engageably supporting the inner surface of the spring.

17. A bearing preload cage assembly as set forth in claim 14
wherein the first and second bearings are positioned in a back-to-back arrangement.

18. A bearing preload cage assembly as set forth in claim 17
wherein the first and second inner races are fixed on a reduced intermediate end portion of the shaft;
wherein the first inner race engageably abuts an annular shoulder of the shaft facing the reduced intermediate end portion; and
wherein a nut is threadedly received on a threaded terminal end portion of the shaft, the terminal end portion being reduced in diameter from the intermediate end portion, the nut when tightened being engaged with the inner race of the second bearing and biasing the inner races of the second bearing and of the first bearing against the annular shoulder of the shaft.

19. A bearing preload cage assembly as set forth in claim 18
a ring-like spacer received on the intermediate end portion between the inner races of the first and second bearings.

20. A bearing preload cage assembly as set forth in claim 14
wherein the bearing housing includes:
a main housing member;
the first supporting member being an inboard bearing end cover fixed to the main housing member and engageable with the first cage segment for preventing axial movement thereof in an inboard direction; and
the second supporting member being an outboard bearing end cover fixed to the main housing member and engageable with the second cage segment for preventing axial movement thereof in an outboard direction.

21. A bearing preload cage assembly as set forth in claim 14 an anti-rotation member intermediate and engaged with the bearing housing and with one of the cage segments for preventing rotation of the first and second cage segments relative to the bearing housing.

22. A bearing preload cage assembly as set forth in claim 20 wherein the main housing member has an axially extending slot; and wherein a radially extending pin is fixed on one of the cage segments and slidably received with the axially extending slot for preventing rotation of the cage segments relative to the bearing housing.

23. A bearing preload cage assembly as set forth in claim 1 an anti-rotation member intermediate and engaged with the bearing housing and with one of the cage segments for preventing rotation of the first and second cage segments relative to the bearing housing.

24. A bearing preload cage assembly as set forth in claim 1 wherein the resilient member directly biases the second cage segment into engagement with the first outer race and indirectly biases the second outer race into engagement with the first cage segment.

25. A bearing preload cage assembly as set forth in claim 24 wherein the first and second bearings are positioned in a back-to-back arrangement.

26. A bearing preload cage assembly as set forth in claim 25 wherein the first and second inner races are fixed on a reduced intermediate end portion of the shaft;

wherein the first inner race engageably abuts an annular shoulder of the shaft facing the reduced intermediate end portion; and wherein a nut is threadedly received on a threaded terminal end portion of the shaft, the terminal end portion being reduced in diameter from the intermediate end portion, the nut when tightened being engaged with the inner race of the second bearing and biasing the inner races of the second bearing and of the first bearing against the annular shoulder of the shaft.

27. A bearing preload cage assembly as set forth in claim 26 a ring-like spacer received on the intermediate end portion between the inner races of the first and second bearings.

28. A bearing preload cage assembly as set forth in claim 24 wherein the bearing housing includes:

a main housing member;

the first supporting member being an inboard bearing end cover fixed to the main housing member for preventing axial movement of the first cage segment in an inboard direction;

the resilient member being intermediate and engageable with one of the inboard bearing end cover and first cage segment or the outboard bearing end cover and second cage segment; and the second supporting member being an outboard bearing end cover fixed to the main housing member for preventing axial movement of the second cage segment in an outboard direction.

29. A bearing preload cage assembly as set forth in claim 24 an anti-rotation member intermediate and engaged with the bearing housing and with one of the cage segments for preventing rotation of the first and second cage segments relative to the bearing housing.

30. A bearing preload cage assembly as set forth in claim 24 wherein the resilient member is intermediate and engaged with one of the first supporting member and the first cage segment and of the second supporting member and the second cage segment.

31. A bearing preload cage assembly as set forth in claim 1 wherein each castellation of the first cage segment terminates at a radially inwardly extending first castle flange;

wherein each castellation of the second cage segment terminates at a radially inwardly extending second castle flange;

wherein the resilient member is intermediate and engaged with the first and second castle flanges biasing the first castle flange into engagement with the second outer race and the second castle flange into engagement with the first outer race;

wherein each of the first castle flanges has a first annular recess facing the second castle flanges;

wherein each of the second castle flanges has a second annular recess facing the first castle flanges;

wherein the resilient member is received in the first and second annular recesses for thereby biasing the first cage segment into engagement with the second outer race and the second cage segment into engagement with the first outer race;

wherein the first and second bearings are positioned in a back-to-back arrangement;

wherein the first and second inner races are fixed on a reduced intermediate end portion of the shaft;

wherein the first inner race engageably abuts an annular shoulder of the shaft facing the reduced intermediate end portion;

wherein a ring-like spacer is received on the intermediate end portion between the inner races of the first and second bearings;

wherein a nut is threadedly received on a threaded terminal end portion of the shaft, the terminal end portion being reduced in diameter from the intermediate end portion, the nut when tightened being engaged with the inner race of the second bearing and biasing the inner races of the second bearing and of the first bearing against the annular shoulder of the shaft;

wherein the bearing housing includes:

a main housing member;

an inboard bearing end cover fixed to the main housing member and engaged with the first cage segment for preventing axial movement thereof in an inboard direction; and an outboard bearing end cover fixed to the main housing member and engaged with the second cage segment for preventing axial movement thereof in an outboard direction; and wherein one of the cage segments has an annular mounting flange fixed between one of the bearing end covers and main housing member for preventing rotation of the first and second cage segments relative to the bearing housing.

* * * * *